United States Patent
Rimmer et al.

(10) Patent No.: US 7,876,752 B1
(45) Date of Patent: Jan. 25, 2011

(54) METHOD AND SYSTEM FOR PARTITION BASED NETWORK ROUTING

(75) Inventors: Todd M. Rimmer, Exton, PA (US); Frank R. Dropps, Maple Grove, MN (US); Thomas R. Prohofsky, Edina, MN (US); Duane J. McCrory, Malvern, PA (US); Edward C. McGlaughlin, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 57 days.

(21) Appl. No.: 12/201,437

(22) Filed: Aug. 29, 2008

(51) Int. Cl.
*H04L 12/56* (2006.01)

(52) U.S. Cl. .............. 370/389; 370/397; 370/395.31; 370/360

(58) Field of Classification Search .............. None
See application file for complete search history.

(56) References Cited

U.S. PATENT DOCUMENTS

| | | | |
|---|---|---|---|
| 6,628,615 B1 | 9/2003 | Joseph et al. | |
| 6,988,161 B2 * | 1/2006 | McConnell et al. | 710/316 |
| 7,221,650 B1 * | 5/2007 | Cooper et al. | 370/236 |
| 7,400,590 B1 | 7/2008 | Rygh et al. | |
| 7,443,860 B2 | 10/2008 | Johnsen et al. | |
| 7,602,712 B2 * | 10/2009 | Johnsen et al. | 370/231 |
| 7,623,519 B2 | 11/2009 | Tornetta et al. | |
| 2004/0215848 A1 * | 10/2004 | Craddock et al. | 710/39 |
| 2005/0117579 A1 * | 6/2005 | Tasaki et al. | 370/390 |
| 2005/0286511 A1 * | 12/2005 | Johnsen et al. | 370/389 |
| 2008/0117914 A1 * | 5/2008 | Rider | 370/392 |

OTHER PUBLICATIONS

"Notice of Allowance from USPTO dated Apr. 28, 2010 for U.S. Appl. No. 12/201,503".

* cited by examiner

*Primary Examiner*—Huy D Vu
*Assistant Examiner*—Zewdu Beyen
(74) *Attorney, Agent, or Firm*—Klein, O'Neill & Singh, LLP

(57) ABSTRACT

Method and system for routing a network packet received at a port within a network is provided. The method includes (a) generating an index value based on a destination identifier for the network packet; (b) generating one or more physical port numbers based on the index value generated in step (a); wherein each port number identifies a port for sending and receiving network packets; and (c) selecting one of the physical port numbers to route the network packet; wherein the port number is selected based on reaction selector signal that is generated from a partition key table based on a partition key value embedded in the network packet.

18 Claims, 6 Drawing Sheets

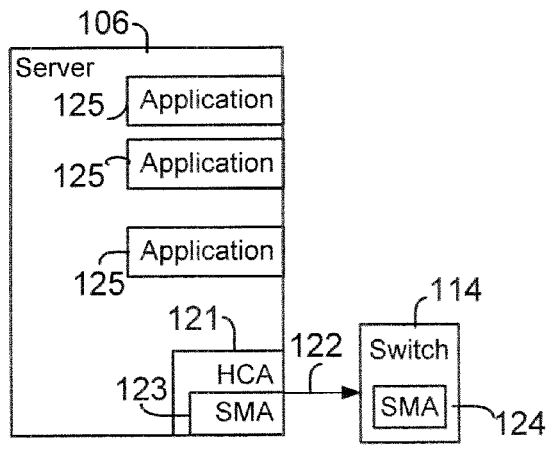
FIG. 1B
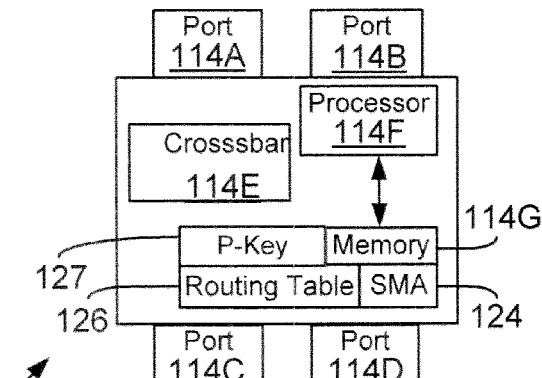
FIG. 1C
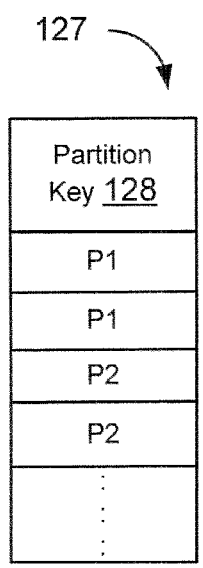
FIG. 1D
FIG. 1E

METHOD AND SYSTEM FOR PARTITION BASED NETWORK ROUTING

BACKGROUND

1. Technical Field

The present disclosure relates to network systems.

2. Related Art

Network systems are commonly used to move network information (may also be referred to interchangeably, as frames, packets or commands) between computing systems (for example, servers) or between computing systems and network devices (for example, storage systems). A network device (may also be referred to as a node) may operate both as a receiving node and a transmitting node to receive and send network information.

Various industry standards, hardware and software components are typically used to implement network communication. InfiniBand ("IB") is one such industry standard used with computing systems and input/output (I/O) devices. IB is used to create fabrics that are complex networks, which may encompass hundreds and even thousands of interconnected hosts/switches/servers, all working in parallel to solve complex problems.

In networks, for example, IB fabrics, use Quality Service (QOS) for network communication. Typically, QOS is used to configure different service levels for end-to-end application communication paths.

One way to implement QOS in an IB fabric is to use independent paths for different applications. The IB standard supports such a mechanism by providing end nodes with multiple addresses and each address results in different path through the IB fabric. The IB standard specifies a maximum address space of 48 k for each fabric, i.e., one can have as many addresses as possible within the 48 k size.

This becomes a challenge in very large fabrics that may include thousands of nodes because assigning multiple addresses per node can quickly consume all the available addresses within 48 k. Hence, one is limited in the number of alternative routes that one can use in large fabrics, where there is greater need for QOS and there are multiple paths available fo communication. Therefore, the standard IE tools available for managing QOS are commercially undesirable.

SUMMARY

In one embodiment, a method for in a network packet received at a port within a network is provided. The method includes (a) generating an index value based on a destination identifier for the network packet; (b) generating one or more physical port numbers based on the index value generated in step (a); wherein each port number identifies a port for sending and receiving network packets; and (c) selecting one of the physical port numbers to route the network packet; wherein the port number is selected based on a direction selector signal that is generated from a partition key table based on a partition key value embedded in the network packet.

In another embodiment, a switch element coupled to one or more computing system within a network is provided. The switch element includes a plurality of ports for receiving and transmitting a network packet; and a memory module for storing various tables.

The memory module stores (i) a routing table having a plurality of index values, where each index value is associated with a plurality of destination identifiers and when the network packet is received, the index value is generated from the routing table;

The memory module also stores (ii) a port redirection table that stores a plurality of physical port numbers associated with a plurality of index values; wherein each physical port number identifies a port for sending and receiving network packets; and wherein based on the index value generated in (i), one or more physical port numbers are generated from the port redirection table.

The memory module further stores (iii) a partition key table that is configured to store a plurality of partition key values and each partition key value is associated with a direction selector signal; wherein the direction selector signal is used for selecting a port number from among the physical port numbers generated in (ii) to route the network packet; and the direction selector signal is based on a partition key value embedded in the network packet.

In yet another embodiment, a network is provided. The network includes a plurality of applications, where each application is executed by one or more computing system; and a plurality of switch elements operationally coupled to one or more computing system for sending and receiving network packets.

Each switch element includes: a plurality ports for receiving and transmitting a network packet; and memory module for storing various tables.

The memory module stores (i) a routing table having a plurality of index values, where each index value is associated with a plurality of destination identifiers and when the network packet is received, the index value is generated from the routing table;

The memory module also stores (ii) a port redirection table that stores a plurality of physical port numbers associated with a plurality of index values; wherein each physical port number identifies a port for sending and receiving network packets; and wherein based on the index value generated in (i), one or more physical port numbers are generated from the port redirection table.

The memory module further stores: (iii) a partition key table that is configured to store a plurality of partition key values and each partition key value is associated with a direction selector signal; wherein to route the network packet, the direction selector signal is used for selecting ort number from among the physical port numbers generated in (ii); an the direction selector signal is based on a partition key value embedded in the network packet.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWING

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures:

FIG. 1B shows an example of a computing node communicating with a switch, according one embodiment;

FIG. 1C shows an example of a switch, according to one embodiment;

FIG. 1D shows an example of a conventional partition key table;

FIG. 1E shows an example of a conventional routing table;

DETAILED DESCRIPTION

Definitions

Figure 1A:
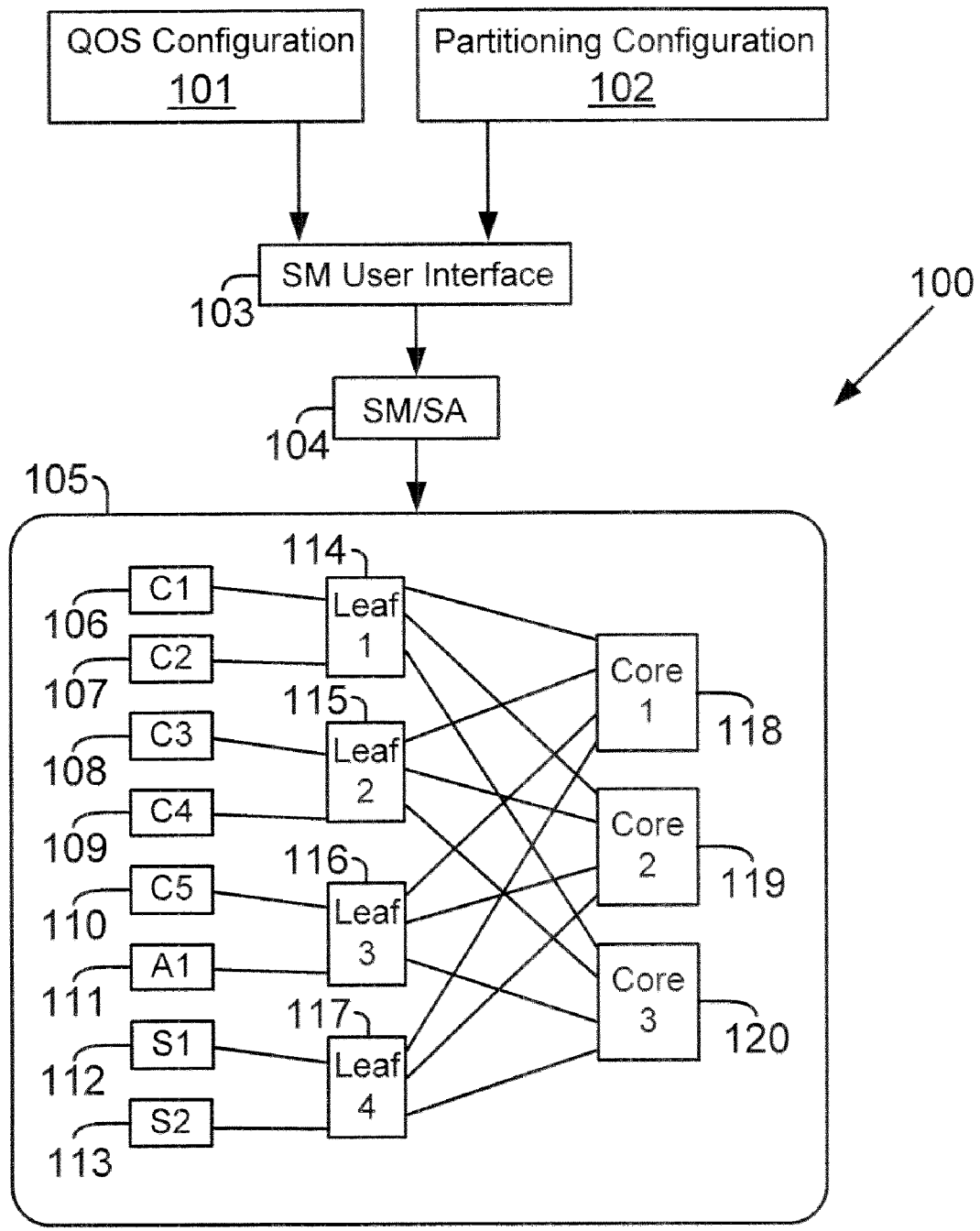
FIG. 1A shows an example of a system using the embodiments disclosed herein.

The following definitions are provided for convenience as they are typically (but not exclusively) used in the InfiniBand (IB) and general networking environment, implementing the various adaptive embodiments described herein.

"DLID": Destination local identifier is a field in an IB packet identifying a local subnet packet destination.

"Fabric": A collection of links, switches, routers that connect to a host channel adapter or a target channel adapter.

"LID" (Local Identifier): An address assigned by a Subnet Manager (SM), unique within a subnet, used for directing packets within the subnet.

"LMC" (LID Mask Control): A per-port value assigned by the Subnet Manager. The value of the LMC specifies the number of Path Bits in the LID.

"Packet": A group of one or more network dat word(s) used for network communication. For example, IB uses IB packets for network communication. A frame may considered a packet.

"Partition": A collection of channel adapter ports that are allowed to communicate with one another. Ports may be members of multiple partitions simultaneously. Ports in different partitions are unaware of each other's presence.

"Partition key": A value within an ID packet that is used to determine and validate membership within a partition. The partition key may be in channel adapters.

"Partition Table": A table of partition keys stored in each port.

"Path": A collection of links, switches and routers that a message traverses from a source port to destination port. Within a subnet, an SLID, DLID and service level (SL) define a path.

"Port": Location on a channel adapter or a switch to which a link is connected. There may be multiple ports on a single channel adapter and switches.

"QOS": means Quality of Service, metrics that predict the behavior, reliability, speed and latency of a network connection.

"Routing Table": A table in a switch that stores information for routing a packet based on addressing information (for example, DLID) in the packet.

"Service Level (SL)": A value in an IB local routing header identifying a quality service level from which a virtual lane for a packet is selected. According to the IB standard, while the appropriate VL for a specific SL may differ, the SL remains constant.

"SLID": An address assigned to a source port by a Subnet Manager.

"Subnet Manager" ("SM"): An entity used for configuring a subnet, where the subnet is a set of IB ports and associated links that have a common subnet identifier (ID). Routers may couple subnets to each other. SM is typically implemented as an application executed at a computing system.

"Switch": A device that facilities network communication conforming to IB and other switch standards/protocols.

"Virtual Lane" (VL): The term VL as defined by Section 3.5.7 of the IB Specification provides a mechanism for creating virtual lanes within a single physical link. A virtual lane represents a set of transmit and receive buffers in a port. A data VL is used to send IB packets and according the IB Specification, is configured by a subnet manager based on a Service Level field in a packet.

To facilitate an understanding of the various embodiments, the general architecture and operation of an IB network switch is first described. The specific architecture and operation of the preferred embodiment will then be described with reference to the general architecture.

It is noteworthy that the disclosed embodiments are not limited to the IB environment. The capabilities disclosed herein are applicable to other network protocols and standards, for example, the Fibre Channel over Ethernet (FCOE) standard and others.

Network System:

FIG. 1A shows a block diagram of an IF based network system 100. Network system 100 includes a fabric 105 that is configured by using Subnet manager/subnet administrator (SM/SA) (jointly referred to as "SM") 104. In one embodiment, SM 104 may be implemented as a software application executed by a computing device. 104 provides a user interface 103 that allows a user to configure fabric 105 devices. In one embodiment, user interface 103 may be a command line interface (CLI) or a Graphical User Interface ("GUI").

In conventional systems, a user inputs separate QOS and partitioning information (shown as 101 and 102). QOS and partitions are set up independent of each other.

Fabric 105 includes various computing nodes and switches. For example, Fabric 105 includes plural computing nodes C1 106, C2 107, C3 108, C4 109 and C5 110, administration node A1 111, storage nodes S1 112 and S2 113, plural leaf switches leaf1 114, leaf2 115, leaf3 116, leaf4 117 and plural core switches core1 118, core2 119 and core3 120.

Computing nodes 106-113 may include computing systems several functional components. These components may include a central processing unit (CPU), main memory, input/output ("I/O") devices, and streaming storage devices (for example, tape drives). For a computing node, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system (or computing node) with the CPU and main memory is often referred to as a host system.

Computing Node:

FIG. 1B shows an example of a computing node 106 (for example, an IF server) that is operationally coupled to switch 114 via a link 122. Computing node 106 includes a host channel adapter (RCA) 121 that is coupled to switch 114 via link 122. HCA 121 interfaces with a server processor (not shown) send and receive information via switch 114. Server 106 executes one more applications 125 to communicate with other servers via link As defined by the IB standard version 1.2, HCA 121 may include a Subnet Management Agent (SMA) 123. SMA 123 implements a SMA protocol, which is used by SM/SA 104 (FIG. 1A) to configure the QOS and partitioning attributes for HCA 121.

Switch:

FIG. 1C shows an example of switch 114 used according to one embodiment of the present disclosure. Switch 114 may be an IB switch. Switch 114 includes plurality of ports, shown as 114A-114D and a crossbar 114E. Ports 114A-114D may be coupled to other devices (including switches, servers and others) using links example, 122).

Switch 114 includes a processor module 114F that executes firmware out of memory 114D to control overall switch 114 operations. Switch 114 stores SMA 124 as defined by the IB standard in memory 114G. SMA 124 implements the SMA protocol, which is used by the SM/SA 104 to configure switch routing, QOS and partitioning attributes.

Switch 114 stores a partition key (P-key) table 127, described below with respect to FIG. 1D. Switch 114 further stores a routing table 126 route frames. The table is described below with respect to FIG. 1E.

Partition Table/Routing Table:

FIG. 1D shows an example of a partition key table 127 as used by conventional systems. Partition key table is set up by SM/SA 104 and may be stored at each input port in each node (for example, a switch and HCA). Table 127 includes a column 128 that specifies a partition key that is permitted to be received at a given input port (for example, Pkey1 (P1) may be permitted to be received at port 114A (FIG. 1C). The partition keys are used to grant or deny access, as described below in detail.

FIG. 15 shows an example of a routing table 126 that includes columns 131 and 132, Column 131 includes the destination address (shown as DLID) for forwarding an IB packet. Column 132 stores the associated port numb for routing an IB packet particular destination. For example, port number P1 is used to send a packet with a DLID of D1.

Figure 2A:
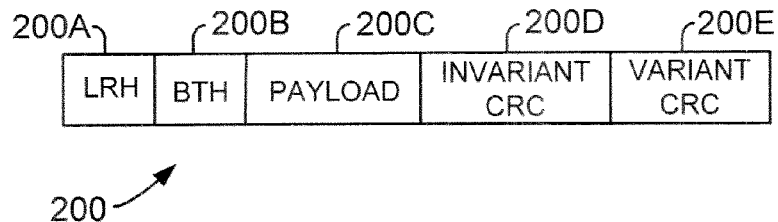
FIG. 2A shows an example of an IF packet.

IB Packet Structure:

FIG. 2A provides an example of an IB packet structure 200 that may be used in the various embodiments described herein. Packet structure 200 includes a local route header (LRH) 200A, a base transport header (BTH) 200B, packet payload 200C, invariant cyclic redundancy code (CRC) 200D, and variant CRC 200E. Packet structure 200 is described in Infiniband Architecture Specification, Volume 1, Chapter 6, titled "Data Packet Format", incorporated herein by reference in it entirety.

Figure 2B:
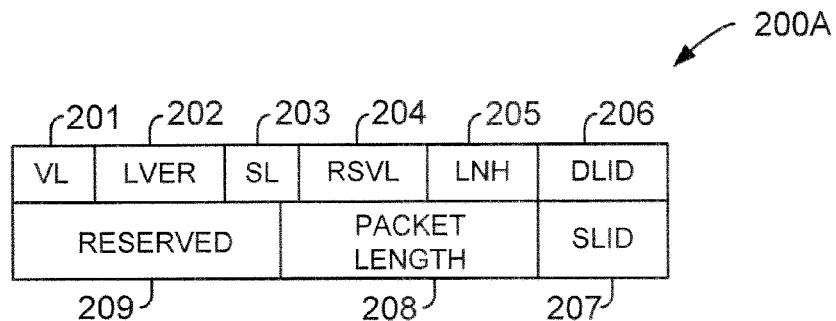
FIGS. 2B and 2C show IB header examples.

FIG. 2B shows a block diagram of LRH 200A, with plural fields for routing packets within the same subnet. The fields may be used for routing network packets in an IB based network environment. LRH 200A includes a virtual lane (VL) field 201 that identifies which receive buffer and flow control credits should be used for processing a received packet, and link version (Lver) field 202 specifies the version of the LRH packet 200A. LRH 200A also includes service level (SL) field 203, a standard field that is used identify a VL for a packet and assigned by SM/SA 104

LRH 200 further includes a Link next header (LNH) field 205, which specifies what header follows LRH 200A. Fields 204 (RSVL) and 209 (Reserved) are reserved fields.

LRH 200A also includes a DLID field 206 that specifies the local destination to which switch 112 delivers the packet and SLID field 207 that indicates the local source of a network packet. Packet length field 208 specifies the number of words contained in a packet.

Figure 2C:
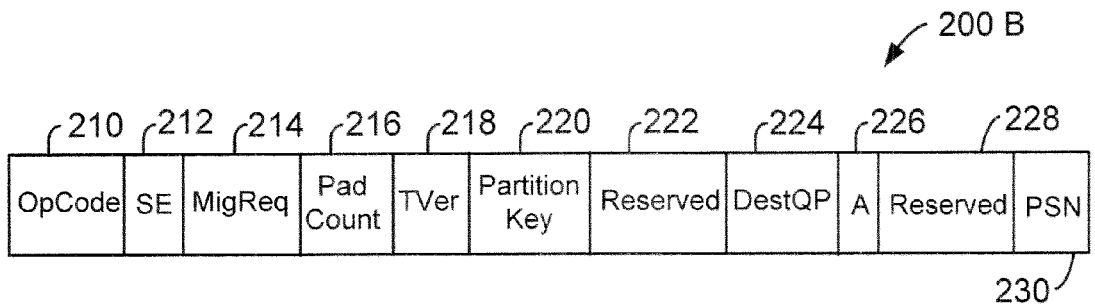

FIG. 2C shows a block diagram of a base transport header (BTH) 200B field of a packet, with plural fields. The BTH 200B field includes OpCode 210, Solicited Event (SE) 212, MigReq 214, Pad Count Transport Header Version (Tver) 218, Partition Key Destination (DestQP) 224, Acknowledge Request ("A") 226, packet sequence number (PSN) 230 and two Reserved fields 222 and 228. The Partition Key indicates which logical partition is associated with packet. The DestQP 224 field indicates the work queue pair (QP) number the destination. The PSN 230 field is used to detect a missing or duplicate packet.

Figures 3, 4B, 4C, 4D:
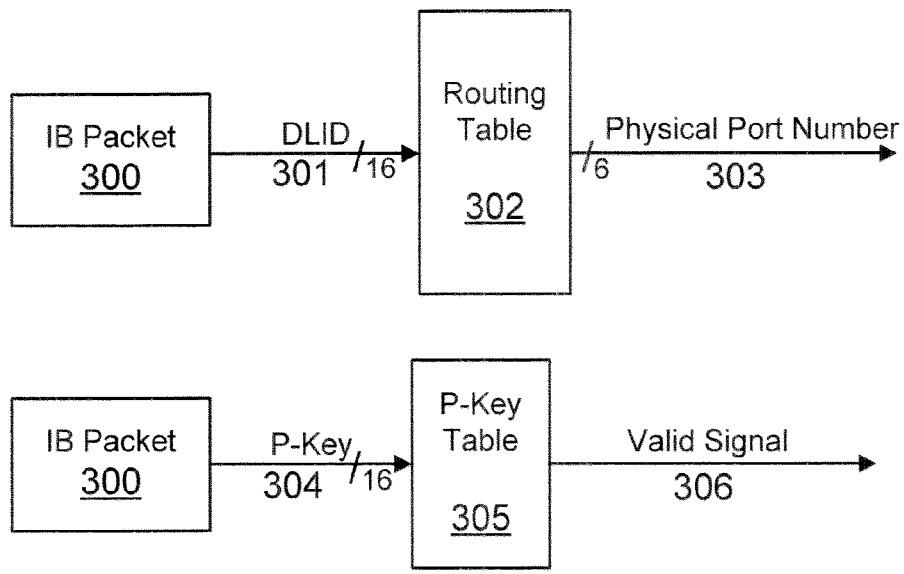
FIG. 3 shows an example of using a conventional routing table and a conventional partition key table.
FIG. 4B shows an example of a routing table, according to one embodiment.
FIG. 4C shows an example of a port redirection table, according to one embodiment.
FIG. 4D shows an example of an enhanced partition key table, according to one embodiment.

Conventional Packet Routing:

FIG. 3 shows an example of conventional packet routing and use of Partition Keys (220, FIG. 2C). An IB packet 300 whose structure is similar to packet structure 200 shown in FIG. 2A (used interchangeably throughout this specification), is received by a port, for example, Port 114A of switch 114. The DLID 301 (also shown as 206 in FIG. 2B, and used interchangeably throughout this specification) and partition key 304 (also shown as 220 in FIG. 2C, and used interchangeably throughout this specification) are processed in parallel. DLID 301 is a 16-bit field that is used to determine the physical port number 303 from a routing table 302 (similar to the routing table 126, described above with respect to FIG. 1D). The DLID 301 is used as an address/index into the routing table 302, to select a single row in the routing table 302. The selected row includes the Physical Port Number 303. In one embodiment of a 36-port switch, the Physical Port Number 303 may be 6 bits.

The Physical Port Number 303 is provided to the cross bar (for example, 114E, FIG. 1C) that specifies an output port [for example, 114B, 114C or 114D] to transmit the IB packet.

In parallel, partition key (also shown and referenced as "P-Key" or "Pkey" or "P") 304 is provided to the Partition Key Table (shown as P-Key Table) 305 (similar to the P-Key table 127, FIG. 1D). The P-Key Table 305 is typically a Content Addressable Memory (CAM), which uses the P-Key 304 as an index. If P-Key 304 is found in table 305, then a Valid signal 306 is generated. The value of valid signal 306 indicates whether communication is permitted or not. For example, a valid signal value of 1 may indicate that communication between a source and destination is permitted. A valid signal value of 0 may indicate that communication between a source and destination is not permitted.

When the valid signal 306 is 0, the packet is discarded with an error and is not provided to the cross bar 114E. When the valid signal 306 is 1, the packet is provided to cross bar 114E and is output via physical port number 303.

As shown above, conventional routing techniques use the partition information and the routing tables independently with no correlation. The partition keys are simply used to grant or deny access and are not used to influence routing paths. The embodiments disclosed herein allow one to use the partition information to influence packet routing, as described below and referenced as "Enhanced Packet Routing".

Figure 4A:
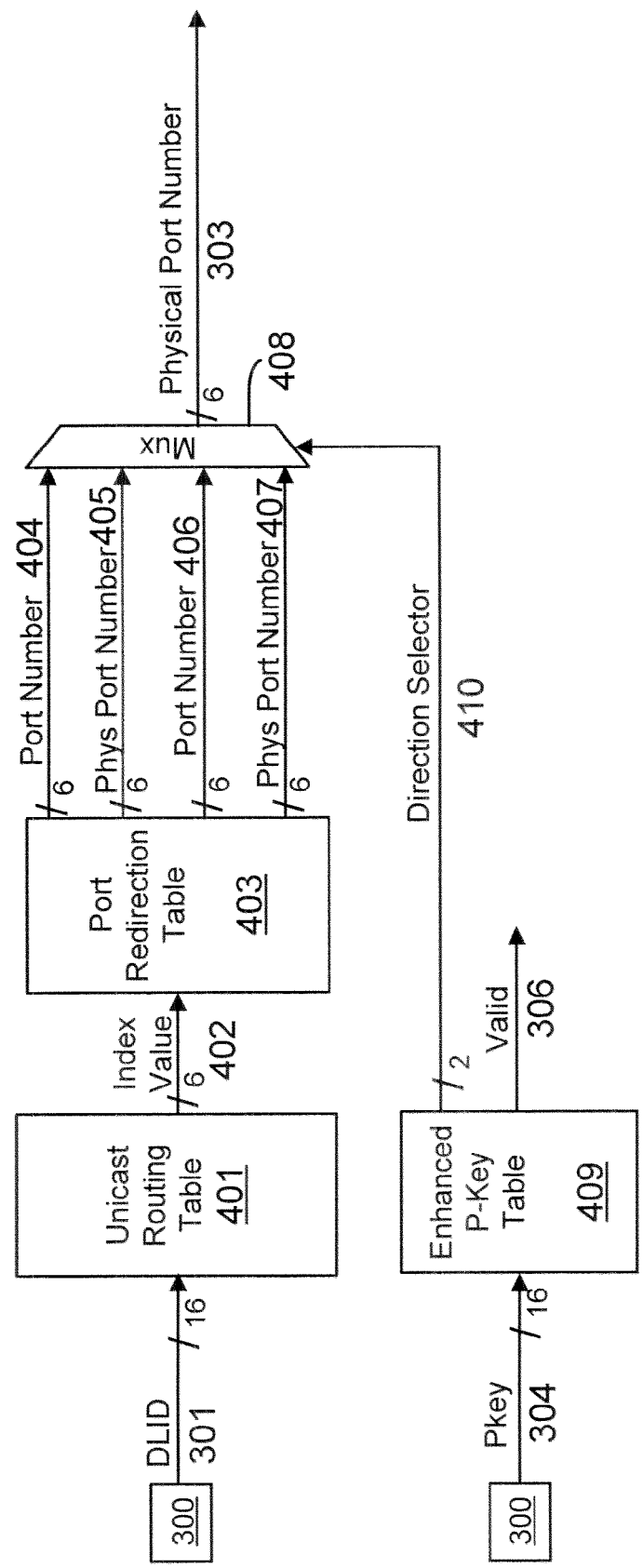
FIG. 4A shows an example of a system for routing packets, according to one embodiment.

Enhanced Packet Routing:

FIG. 4A shows a system 400, according to one embodiment for enhanced routing of packets where a partition key (304) is used to influence packet routing (i.e. route selection), instead of simply being used as a tool to grant or deny access. IB packet 300 is received with DLID 301 and P-Key 304. DLID 301 is used as an address/index into unicast routing table 401 (also referred to as "routing table" 401) to select a row from routing table 401. Routing table 401 provides an index value (also referred to as "port selector index value") 402 that is used to select one or more physical port numbers from a port redirection table 403. One or more port numbers (404-407) are then fed into a multiplexer 408.

A particular port is selected based on a direction selector signal (or command) 410 that is generated from enhanced Partition Key table 409. The direction selector signal 410 determines which one of a plurality of ports is selected for routing IB packet 300.

FIG. 4B shows an example of routing table that includes columns 131 and 411. Column 131 includes DLID values (301) and column 411 includes port selector index values (402) to select one or more port numbers from Port Redirection table 403. In one embodiment, for a 36-port switch, the Port Selector Index value may be 6 bits.

FIG. 4C shows an example of Port Redirection table 403 with columns 411 and 412. Column 411 stores Port Selector index values (402). Column 412 stores port numbers associated with the Port Selector index values. For example, Port selector index value I1 may be associated with multiple port numbers P1, P2, P3, P4 and others.

In one embodiment, for a 36-port switch, Port Redirection table 403 may have 64 entries. Entries 0-36 include a single Physical Port Number 404 and Port Redirection table entries 37-63 include Physical Port Numbers 404-407.

FIG. 4D shows an example, of enhanced Partition Key table 409. Table 409 is different from table 127 because it includes direction selector (410) in column 413. Direction selector values (shown as "DS") are assigned by SM/SA 104 to select a particular port associated with a particular partition.

Table 409 may also be implemented as a Content Addressable Memory (CAM), which uses the P-Key 304 as an index to gene direction selector signal 410. In one embodiment, the Direction Selector value may be 2 bits.

Referring back to FIG. 4A, the Direction Selector signal 410 is provided to Mux 408 and is used to select one of the Physical Port Numbers 404-407. The selected Physical Port Number (303) is then provided to cross bar 115 to select an output port for transmitting packet 300.

Figure 1F:
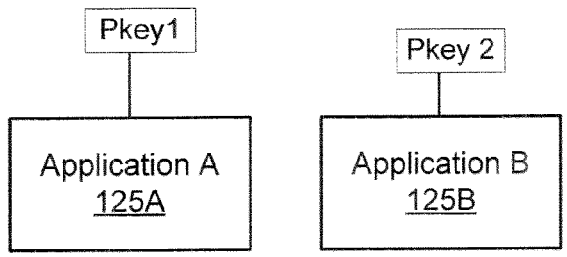
FIG. 1F shows an example of different applications for using the embodiments of this disclosure.

The following provides an example of using system 400, according to one embodiment with respect to FIGS. 1A, 1F and 4A. FIG. 1F shows three applications Computing Application A (shown as Application 125A), Computing Application B (shown as Application 125B), and Storage and Administration Application (shown as Application 125C) that may be active at any given time. Each application may be assigned a unique partition key (shown as Pkey 1, Pkey 2 and Pkey 3) during Partitioning Configuration 102 (see FIG. 1A). For illustration sake, assume that the three applications 125A-125C may be executed as follow:

| Application | Partition Key | Servers |
|---|---|---|
| Application 125A | Pkey1 | 106, 107, 108 |
| Application 125B | Pkey2 | 109, 110 |
| Application 125C | Pkey3 | 106-113 |

Each server may be assigned a unique DLID 301 (FIG. 4A). For simplicity sake, assume that DLIDs 301 are assigned based on a matching server number (e.g. Server 106 may be assigned DLID D106).

Given three applications 5A-125C and three core switches 118-119, the QOS Configuration 101 may specify to use Core Switch 118 for Application 125A, Core Switch 119 for Application 125B and Core Switch 120 for Application 125C, For this example case, SM/SA 104 may configure Leaf Switch 115 as follows:

| Routing 401 Table | |
|---|---|
| DLID 301 | Index Value 411 |
| D106 | I37 |
| D107 | I37 |
| D108 | I1 |
| D109 | I2 |
| D110 | I37 |
| D111 | I37 |
| D112 | I37 |
| D113 | I37 |

Port Redirection Table 403:

| Index 411 | PortNum 404 | PortNum 405 | PortNum 406 |
|---|---|---|---|
| I1 | to C3 108 | to C3 108 | to C3 108 |
| I2 | to C4 109 | to C4 109 | to C4 109 |
| I37 | to Core 118 | to Core 119 | to Core 120 |

In this example, since there are only three core switches, Port Number 407 in the Port Redirection Table 403 may not be used. Similarly Table entries for Index Values 411 I3-I36 and I38-I63 may not be used.

Enhanced PKey Table 409 may be configured as follows:

| PKey 128 | DirectionSelector 413 |
|---|---|
| Pkey1 | 0 (selectsPort Number 404) |
| Pkey2 | 1 (selectsPort Number 405) |
| Pkey3 | 2 (selectsPort Number 406) |

Figure 5:
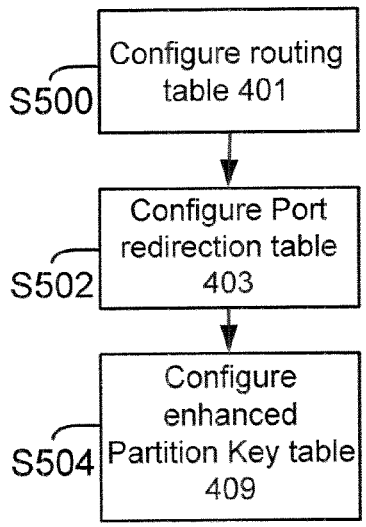
FIG. 5 shows a process flow diagram for configuring an enhanced partition key table and routing tables, according to one embodiment.

In this example, separation of traffic for the three applications 125C may be achieved by using a unique core switch 118-120 and corresponding unique links to leaf switches 114-117. The configuration of Leaf switches 114, 116-117 may also be similar:

Process Flow Diagram:

FIG. 5 shows a process flow diagram for configuring the routing table 401; Port Redirection table 403 and the Enhanced Partition Key table 409, according to one embodiment. The process starts in step S300 when SM/SA 104 configures the routing table 401. During this step, each DLID 301 is assigned an index value 402.

In step S502, the Port Redirection table 403 is configured. During this step each index value 402 is associated with a certain number of physical port numbers.

In step S504, the Enhanced Partition Key table 409 is configured. During this step, a Direction Selector value 410 is associated with each partition key 304. The direction selector value 410 is used to select a particular port from among a plurality of ports to transmit a packet.

Figure 6:
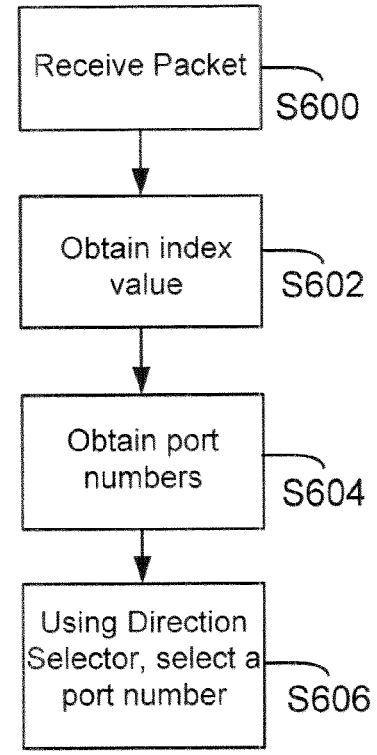
FIG. 6 shows a process flow diagram for routing packets, according to one embodiment.

FIG. 6 shows a process flow diagram for routing packets, according to one embodiment. The process starts in step S600, when a packet (300, FIG. 4) is received. In step S602, the DLID of the packet is obtained and an index value from routing table 401 is selected.

In step S604, using the index value, one or more physical port numbers are obtained from the Port Redirection table (403). Thereafter, in step S606, one of the physical port numbers is selected based on the Direction Selector signal from the partition key table 409. As discussed above, the partition key influences the Direction Selector value 410.

In one embodiment a route for a packet through a fabric can be selected based on a combination of DLID 301 and PKey 304. In large fabrics, for example, 105 (FIG. 1A) where there may be thousands of servers 106-113, the foregoing embodiments permit control over routes selection through the fabric without being limited by the standard 48K limit in the IF address space. For example, in a fabric 105 with 24,000 servers 106-113, there is a limit of 2 DLIDs 301 which could be assigned to a server 106-113 to stay within the 48K limit. This means that when a server 106 is running a plurality of applications 125, there can be only 2 unique routes to those applications 125. However such a fabric 105 could have 100s of unique paths between servers 106-113 by routing among a plurality of core switches 118-120.

In one embodiment, partition key may be used to select more routes than what may be allowed or used in conventional routing. This provides better control and efficiency in operating fabric 105 because different applications 125 may use different unique routes within the fabric to send and receive packets.

Although the present disclosure has been described with reference to specific embodiments, these embodiments are illustrative only and not limiting. Many other applications and embodiments of the present disclosure will be apparent in light of this disclosure and the following claims.

What is claimed is:

1. A method for routing a network packet received at a port within a network, comprising:
   (a) determining an index value based on a destination identifier for the network packet;
   (b) determining one or more physical port numbers based on the index value determined in step (a); wherein each port number identifies a port for sending and receiving network packets;
   (c) determining a direction selector signal from a partition key table based on a partition key value embedded in the network packet, wherein the partition key value is used as an index into the partition key table to determine the direction selector signal, wherein the partition key table is configured to store a plurality of partition key values and each partition key is associated with a direction selector signal that is used for selecting a network switch port to route the network packet; and
   (d) selecting one of the physical port numbers to route the network packet based on the direction selector signal.

2. The method of claim 1, wherein the index value is generated from a routing table that stores a plurality of index values associated with a plurality of destination identifiers.

3. The method of claim 1, wherein the one or more physical port numbers are generated from a port redirection table that stores the physical port numbers associated with a plurality of index values.

4. The method of claim 1, wherein the network packet is an InfiniBand ("IB") packet that is received by an IB switch port within the network.

5. The method of claim 1, wherein a subnet manger configures the direction selector signal value in the partition key table.

6. A switch element coupled to one or more computing systems within a network; comprising:

a plurality of ports for receiving and transmitting a network packet; and
a memory module for storing:
   (i) a routing table having a plurality of index values, where each index value is associated with a plurality of destination identifiers and when the network packet is received, the index value is generated from the routing table;
   (ii) a port redirection table that stores a plurality of physical port numbers associated with a plurality of index values; wherein each physical port number identifies a port for sending and receiving network packets; and wherein based on the index value generated in (i), one or more physical port numbers are generated from the port redirection table; and
   (iii) a partition key table that is configured to store a plurality of partition key values and each partition key value is associated with a direction selector signal; wherein a partition key value embedded in the network packet is used as an index into the partition key table to determine the direction selector signal; and wherein the direction selector signal is used for selecting a port number from among the physical port numbers generated in (ii) to route the network packet.

7. The switch element of claim 6, wherein the network packet is an InfiniBand ("IB") packet that is received by the switch element.

8. The switch element of claim 6, wherein a subnet manger configures the direction selector signal value in the partition key table.

9. The switch element of claim 6, wherein the subnet manager is executed by a computing system within the network.

10. The switch element of claim 6, wherein a plurality of applications are executed by one or more computing systems within the network and each application is assigned a partition key.

11. The switch element of claim 10, wherein the plurality of applications include a computing application; and an administration application for managing storage systems within the network.

12. A network; comprising:
   a plurality of applications, where each application is executed by one or more computing systems; and
   a plurality of switch elements operationally coupled to the one or more computing systems; wherein each switch element includes a plurality of ports for receiving and transmitting a network packet; and a memory module for storing:
   (i) a routing table having a plurality of index values, where each index value is associated with a plurality of destination identifiers and when the network packet is received, the index value is generated from the routing table;
   (ii) a port redirection table that stores a plurality of physical port numbers associated with a plurality of index values; wherein each physical port number identifies a port for sending and receiving network packets; and wherein based on the index value generated in (i), one or more physical port numbers are generated from the port redirection table; and
   (iii) a partition key table that is configured to store a plurality of partition key values and each partition key value is associated with a direction selector signal; wherein a partition key value embedded in the network packet is used as an index into the partition key table to determine the direction selector signal; and wherein the direction selector signal is used for selecting a port number from among the physical port numbers generated in (ii) to route the network packet.

13. The network of claim 12, wherein the network packet is an InfiniBand ("IB") packet that is received by the switch element.

14. The network of claim 12, wherein a subnet manger configures the direction selector signal value in the partition key table.

15. The network of claim 12, wherein the subnet manager is executed by a computing operationally coupled to network.

16. The network of claim 12, wherein the plurality of applications include computing applications.

17. The network of claim 12, wherein the plurality of applications include an administration application for managing storage systems within the network.

18. The network of claim 12, wherein each application is assigned a unique partition key and based on the assigned partition key, each application is assigned a unique route selected based on the direction selector signal generated from the partition key table.

* * * * *

UNITED STATES PATENT AND TRADEMARK OFFICE
CERTIFICATE OF CORRECTION

| | | |
|---|---|---|
| PATENT NO. | : 7,876,752 B1 | Page 1 of 2 |
| APPLICATION NO. | : 12/201437 | |
| DATED | : January 25, 2011 | |
| INVENTOR(S) | : Todd M. Rimmer et al. | |

It is certified that error appears in the above-identified patent and that said Letters Patent is hereby corrected as shown below:

On the Title page, Item (57), in "Abstract", line 9, delete "reaction" and insert -- a direction --, therefor.

In column 1, line 26, after "Quality" insert -- of --.

In column 1, line 43, delete "fo" and insert -- for --, therefor.

In column 1, line 43, delete "IE" and insert -- IB --, therefor.

In column 1, line 49, delete "in a" and insert -- routing a --, therefor.

In column 2, line 25, after "plurality" insert -- of --.

In column 2, line 44, delete "ort" and insert -- a port --, therefor.

In column 2, line 45, delete "an" and insert -- and --, therefor.

In column 2, line 65, after "according" insert -- to --.

In column 3, line 42, delete "dat" and insert -- data --, therefor.

In column 3, line 56, after "to" insert -- a --.

In column 4, line 2, after "quality" insert -- of --.

In column 4, line 19, after "according" insert -- to --.

In column 4, line 67, delete "(RCA)" and insert -- (HCA) --, therefor.

Signed and Sealed this
Twenty-first Day of June, 2011

David J. Kappos
*Director of the United States Patent and Trademark Office*

CERTIFICATE OF CORRECTION (continued)
U.S. Pat. No. 7,876,752 B1

In column 5, line 18, delete "1140" and insert -- 114G --, therefor.

In column 5, line 25, after "126" insert -- to --.

In column 5, line 37, delete "15" and insert -- 1E --, therefor.

In column 5, line 41, after "packet" insert -- for a --.

In column 5, line 52, delete "it" and insert -- its --, therefor.

In column 6, line 7, after "Count" insert -- 216, --.

In column 6, line 10, after "Key" insert -- 220 --.

In column 7, line 11, after "table" insert -- 401 --.

In column 7, line 29, after "selector" insert -- values --.

In column 7, line 35, delete "gene" and insert -- generate --, therefor.

In column 7, line 66, delete "5A-125C" and insert -- 125A-125C --, therefor.

In column 8, line 51, delete "S300" and insert -- S500 --, therefor.